United States Patent [19]

Odenthal

[11] Patent Number: 5,046,603
[45] Date of Patent: Sep. 10, 1991

[54] TRANSFER APPARATUS, ESPECIALLY FOR PACKAGING EQUIPMENT FOR PAPER STACKS IN THE PAPER INDUSTRY

[75] Inventor: Heinz F. Odenthal, Zülpich, Fed. Rep. of Germany

[73] Assignee: Ostma Maschinenbau GmbH, Zulpich, Fed. Rep. of Germany

[21] Appl. No.: 462,419

[22] Filed: Jan. 9, 1990

[30] Foreign Application Priority Data

Feb. 9, 1989 [DE] Fed. Rep. of Germany ....... 3903820

[51] Int. Cl.⁵ .............................................. B65G 21/14
[52] U.S. Cl. .................................. 198/812; 198/588; 198/594
[58] Field of Search ....................... 198/812, 588, 594

[56] References Cited

U.S. PATENT DOCUMENTS 2,576,217 11/1951 Eggleston ...................... 198/812 X
4,260,053 4/1981 Onodera .............................. 198/812

FOREIGN PATENT DOCUMENTS

| | | | |
|---|---|---|---|
| 0517708 | 2/1931 | Fed. Rep. of Germany | 198/812 |
| 1218942 | 6/1966 | Fed. Rep. of Germany | 198/812 |
| 1915647 | 10/1970 | Fed. Rep. of Germany | 198/812 |
| 1407861 | 7/1988 | U.S.S.R. | 198/812 |
| 2147866 | 5/1985 | United Kingdom | 198/812 |

Primary Examiner—Robert P. Olszewski
Assistant Examiner—James R. Bidwell
Attorney, Agent, or Firm—Herbert Dubno

[57] ABSTRACT

A transfer table, especially for packaging machines for stacks of paper in the paper industry comprises a plurality of rigid table elements which are linked together in the manner of a chain and are guided into a rigid transfer table configuration cantilevered on a support of the device in an extended position and capable of being guided into a zigzag or rolled-up position on the frame in a retracted position of the table. A transfer belt passes over the table and around deflection rollers mounted on the frame and defining compensating loops which contract as the table extends and expands as the table is contracted.

4 Claims, 4 Drawing Sheets

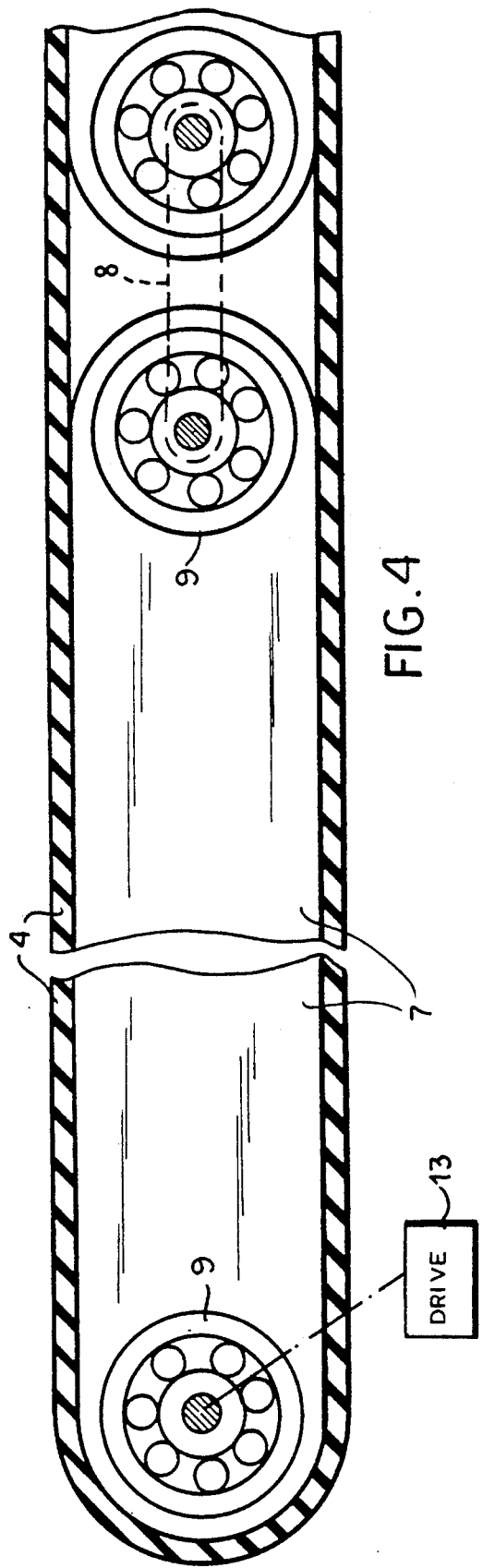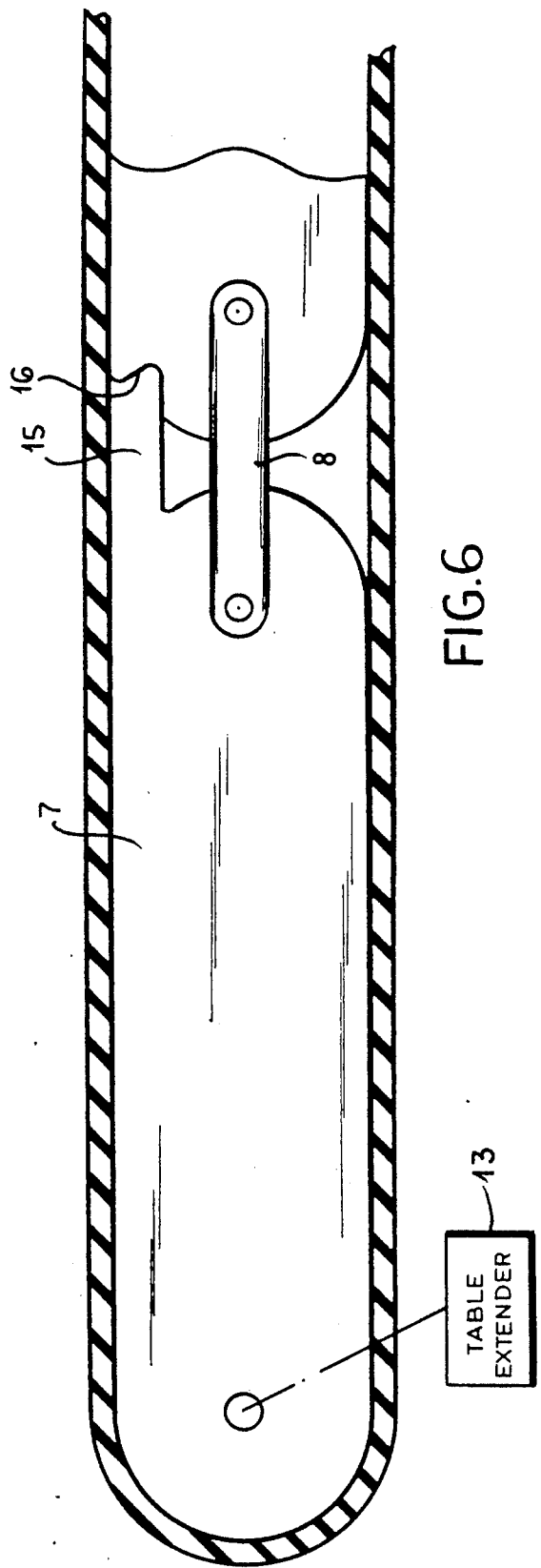

TRANSFER APPARATUS, ESPECIALLY FOR PACKAGING EQUIPMENT FOR PAPER STACKS IN THE PAPER INDUSTRY

FIELD OF THE INVENTION

My present invention relates to a transfer apparatus, especially for packaging equipment for paper stacks in the paper industry which comprises an extendable and retractable transfer table over which a transfer belt can pass and which also has a multiplicity of rollers around which the belt passes.

BACKGROUND OF THE INVENTION

In the paper industry, equipment for the packaging of paper stacks can have, associated therewith, a so-called transfer device or apparatus having a transfer table which can be extendable and retractable and over which a belt can pass.

The apparatus has a multiplicity of deflection rollers around which the belt can pass. The belt passes onto the upper surface of the transfer table, around a front deflection roller and then around the multiplicity of deflection rollers mentioned earlier along a return path. At least one of these deflection rollers is constituted as a compensating roller and can shift in position to vary the length of a belt loop as the transfer table is extended or retracted.

It will be understood that at least one of the deflection rollers can be driven so that the belt can be displaced along the table to transfer a stack of paper thereon.

In the paper industry, such transfer apparatus may be used to take up an unpackaged paper stack at one end and to feed this stack into the wrapping mechanism at the other end.

Because the transfer device must accommodate to various formats of the paper stack, i.e. different dimensions of a paper sheet stack to be accommodated thereby and hence the degree of shift of a stack for the packaging operation, the transfer table may have to be extended or retracted during format changes. In any case the belt will displace the paper stack along the portion of the transport path defined by this transfer table.

In the transfer apparatus in current use for this purpose, the transfer table has a telescoping construction in which one part of the table telescopingly receives another part thereof and the transfer table as a whole is telescopingly extendable and retractable. As a result, the extension and retraction are limited by the telescoping construction.

For example, it is not possible to contract the transfer table, because of the requirement of a telescoping construction, to a comparatively short transfer length as may be required in some cases. Furthermore, the transition between portions of a telescoping transfer table may be stepped rather than smooth, causing a stepped movement of the stack as well.

The stepped movement and construction has been found to be detrimental to the operation of the equipment.

OBJECTS OF THE INVENTION

It is, therefore, the principal object of the present invention to provide a transfer apparatus for the above-described purposes which will be free from the drawbacks enumerated above.

A more specific object of the invention is to provide a transfer apparatus, especially for paper-stack packaging equipment, which can allow longer and shorter transfer paths to be obtained without the limitations of earlier systems.

Yet another object of this invention is to provide a transfer apparatus which can be reduced in length to a particularly short transfer length.

Still a further object of the invention is to provide a transfer apparatus for the purposes described without the drawback of the steps hitherto encountered with telescoping constructions of the transfer table.

SUMMARY OF THE INVENTION

These objects and others which will become apparent hereinafter are attained, in accordance with the invention by providing the transport table from a plurality of bar-shaped transport plate elements or segments which are connected at their opposite sides by links in a chain construction and which can be paid out from an assembly of such elements to the desired length, the assembly consisting of a rolled array of the bars or a zigzag assembly thereof.

It is important to the present invention that the bars be held in a predetermined plane upon being fed from the assembly.

Preferably the table plate elements are provided, in the regions in which they are connected to the respective links, i.e. at the respective pivots, with running rollers, for example, ball bearing rollers, while the support frame or housing has upper and lower guide rails which can direct the plates into the zigzag compact assembly or enable the bars to feed into the aforedescribed plane. The lower guide rail can run into the upper guide rail via a branch rail segment.

According to the invention, the table plate elements define in the extended state of the table, whether this extended state utilizes a large number of such elements or a small number thereof, a rigid table structure. There are a variety of ways in which the plate elements in the plane can define a rigid and planar transfer table. For example, the table plate elements in the region in which they define the table can be received at their sides, for example, via the running rollers, in extendable and retractable telescoping rails. Such telescoping rails are common in various arrangements, for example, in the furniture industry.

It is also possible to so arrange the system that the table plate elements upon being aligned in the plane lock together and thereby form a rigid transfer table, the locking and unlocking of the elements being effected at the ends of the branch rail. The extension and contraction of the table can be effected in various ways although preferably the forwardmost plate element is connected with a driver for the extension and contraction.

BRIEF DESCRIPTION OF THE DRAWING

The above and other objects, features and advantages of the present invention will become more readily apparent from the following description, reference being made to the accompanying drawing in which:

FIG. 4 is a cross sectional view showing a table element at the leading edge of the table in greater detail;

FIG. 6 is a view similar to FIG. 4 illustrating an arrangement in which the table elements lock together in the extended position.

SPECIFIC DESCRIPTION

Figure 1:
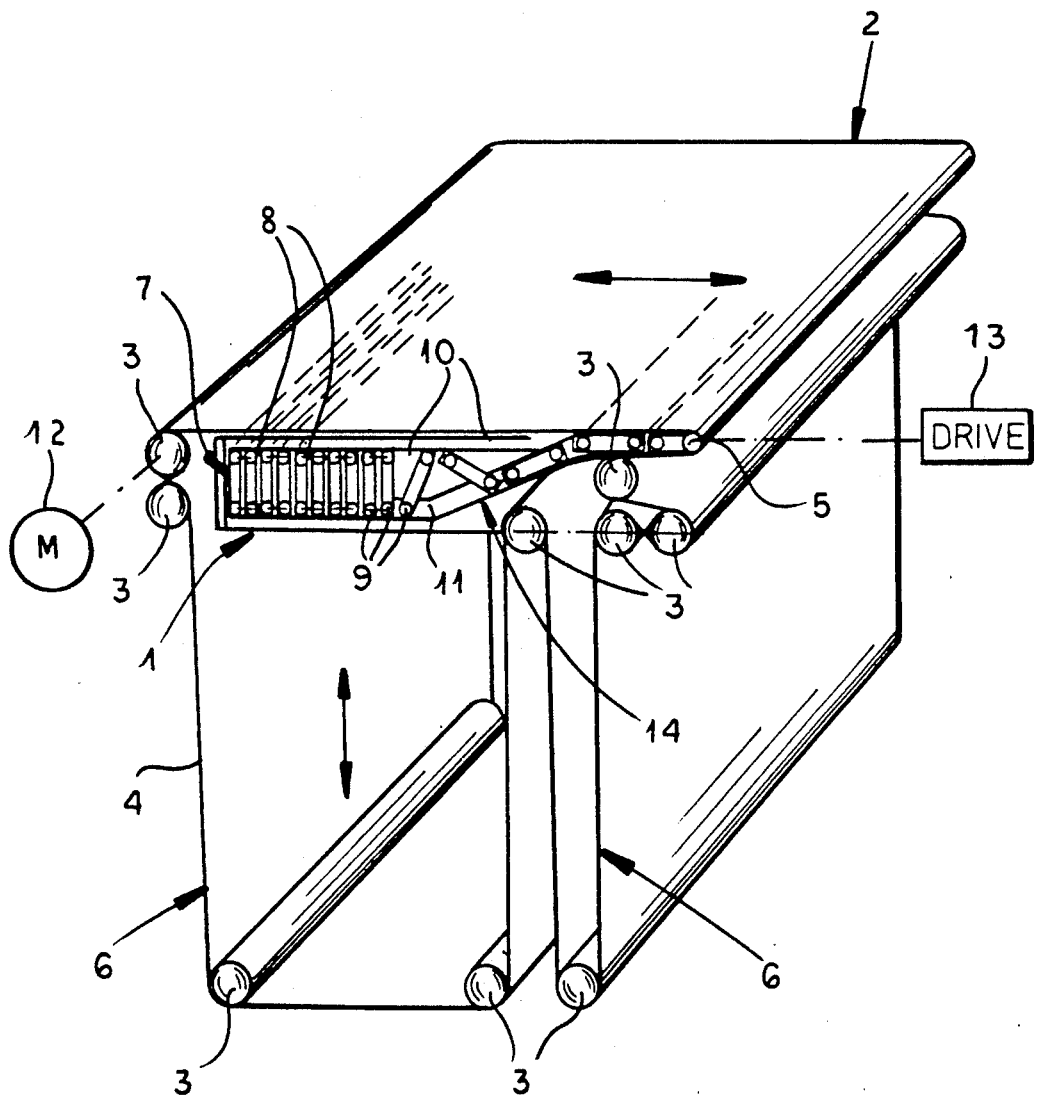
FIG. 1 is a diagram in generally perspective form of the kinematically important components of the transfer apparatus according to the invention in a retracted position of the transfer table.
Figure 2:
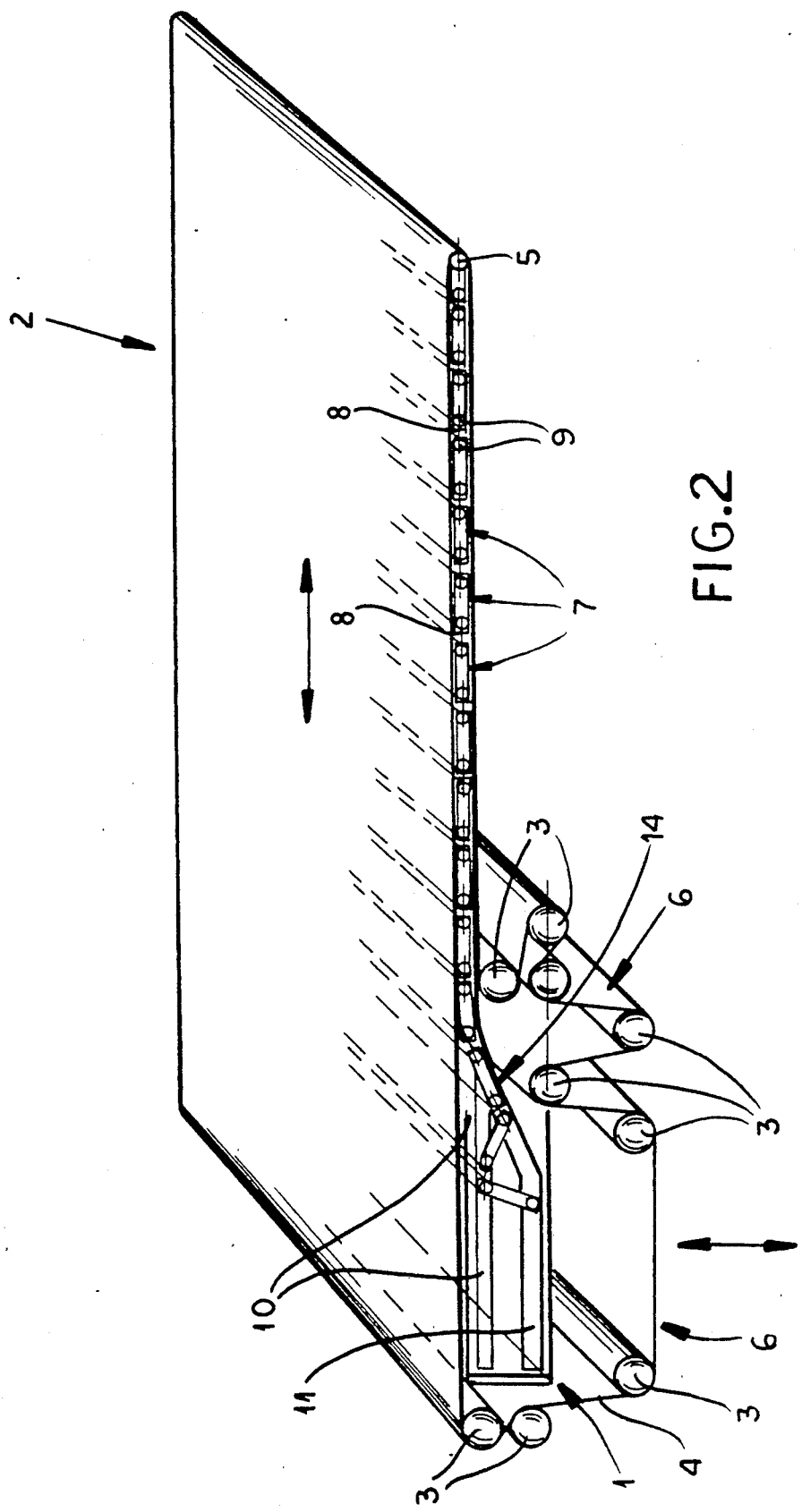
FIG. 2 is a view similar to FIG. 1 showing the table in its extended position.

The transfer apparatus illustrated in FIGS. 1 and 2 is especially useful for the transfer of paper stacks in conjunction with packaging apparatus for such stacks in the paper industry. It may be used for transferring the stack to the wrapping machine or transferring a wrapped stack from the wrapping machine.

The apparatus basically comprises a machine frame generally represented at 1 and not shown in any great detail, an extendable and retractable transfer table 2 on the machine frame, a plurality of deflection rollers 3 which can be fixed to the machine frame and movable thereon to define loops of an endless transfer belt passing around these rollers. The remaining parts of the apparatus have not been illustrated. One of the rollers can be provided with a drive motor 12 to displace the belt along the transfer table. The loops of the belt are represented at 6 and can extend or contract as the table is retracted or extended, respectively.

The drive 13 represented in FIGS. 4 and 6 can act upon the leading table element to draw the table out into its extended position and thereby contract the loops 6, or to retract the table into its retracted position (FIG. 1) and thereby extend the loops 6. The expansion and contraction of the loops is represented by the vertical double-headed arrow in FIGS. 1 and 2 and the deflection rollers which are movable for this purpose can be spring-loaded and provided with vertical guides in a conventional manner. The extension and contraction movement of the table is represented by the horizontal double-headed arrows in FIGS. 1 and 2.

Figure 7:
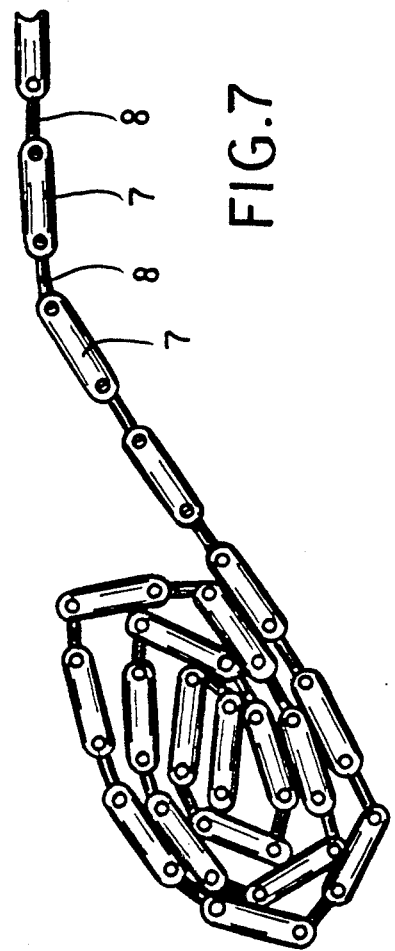
FIG. 7 is a diagram illustrating an embodiment of the invention wherein the links forming the table of the invention are retracted in a rolled condition rather than the accordion or zigzag link assembly of FIGS. 1-6.

According to the invention, the transfer table 2 is composed of a plurality of bar-like table plate elements 7 which are interconnected at their ends, corresponding to the edges of the table by links 8 shown in greater detail in FIGS. 4 and 6, for example, each pivotally connected to two such table elements Because of the link arrangement, the table element 7 and the links 8 form a chain which allows the table elements to be folded in a zigzag configuration (FIG. 1) or rolled up in a coil configuration as shown diagrammatically in FIG. 7.

In the extended position, the table elements 8 are aligned one near one in a horizontal plane (FIG. 2).

As can be seen from FIGS. 2, 4 and 6, the table plate elements 7 form an essentially planar transfer table 2 when they are aligned in the same horizontal plane.

To align the plate elements 7 in the horizontal plane, the elements 7 can be provided in the region of the pivotal connection of the links 8 with these elements 7, with respective running rollers 9 in the form of ball-bearing rollers (FIGS. 1-5).

In the apparatus frame 1, the table plate elements 7 with their running rollers 9 can be guided in upper guide rails 10 and lower guide rails 11 so that, when the table is retracted the elements 7 form the zigzag arrangement shown in FIG. 1.

However, the lower rail 11 can have a branch 14 extending toward the upper rail 10 on each side of the table so that the lower rollers 9 of the zigzag stack shown in FIG. 1 can be guided into the same horizontal plane as the upper rollers.

It will be understood that corresponding rails are provided symmetrically on opposite sides of the table although only one set of such rails has been illustrated in FIGS. 1 and 2.

As the lower rollers 9 are guided into the horizontal plane of the upper rollers, the table plate elements 7 are swung into horizontal alignment to complete the transfer table in its extended form shown in FIG. 2.

Figure 5:
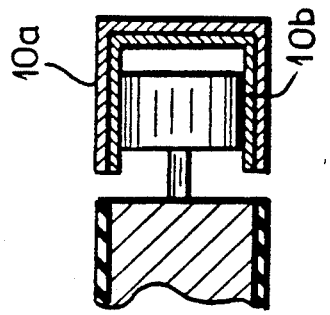
FIG. 5 is a section taken along the line 5—5 of FIG. 3.
Figure 3:
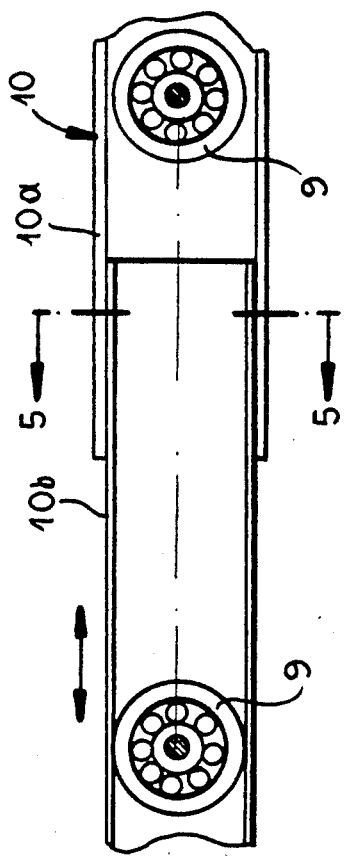
FIG. 3 is a cross sectional view of a portion of the assembly of FIG. 1 showing the telescoping guide rails for the ball bearing rollers of the table elements or links.

As can be seen from FIGS. 3 and 5, the upper rail 10 may comprise a plurality of telescopingly interfitted rail segments 10a and 10b which can extend outwardly with the table elements 7 and thereby hold the extended table rigidly for supporting purposes.

Alternatively, the elements 7 may have formations as have been illustrated, for example, at 15 and 16 in FIG. 6 to permit the table elements to lock together in their horizontally aligned positions to provide a rigid table. It is also possible to operate with fixed guide rails which may extend the full length of the extended table.

The drive for extending and retracting the table preferably engages the leading end or nose 5 of the transfer table which may also be formed as a deflection roller if desired. The extension and retraction of the transfer table may also be controlled via the transfer belt 4, in which case the extension of the table can be coupled with a contraction of one or both of the compensating loops 6.

Whether the transfer table 2 is extended from a zigzag stack as shown in FIGS. 1-6 or from a roll as shown in FIG. 7, in the horizontally extended position of the transfer table, the latter is cantilevered from the support frame.

I claim:

1. A transfer device, especially for a packaging apparatus for paper stacks in the paper industry, comprising:
    a support frame;
    a plurality of bar-shaped transfer table elements interconnected at opposite ends by pivotal links to form a chain having respective pivots, said elements being provided with running rollers at said pivots;
    guide means on said frame for guiding said chain between an extended position wherein said elements define a substantially rigid transfer table in a generally horizontal plane cantilevered from said frame and a retracted position wherein said elements are drawn together on said frame;
    an endless transfer belt passing over said transfer table; and
    a plurality of deflecting rollers around which said belt passes and defining at least one compensating loop which contracts as said table is extended and expands as such table is retracted, said guide means being constructed and arranged to guide said elements into a zigzag orientation upon retraction of said table and including upper and lower guide rails, said lower guide rail having a branch rail segment directing said running rollers into said upper guide rail.

2. The device defined in claim 1 wherein said guide rail is composed of telescopingly interconnected rail segments.

3. The device defined in claim 1, further comprising means on said elements for locking them together in said plane to form said substantially rigid table as said elements are guided along said branch segment into said plane and for unlocking said elements from one another as said elements are guided out of said plane upon retraction of said table.

4. The device defined in claim 1, further comprising a drive connected to a leading one of said elements for extension and retraction of said table.

* * * * *